Patented May 17, 1927.

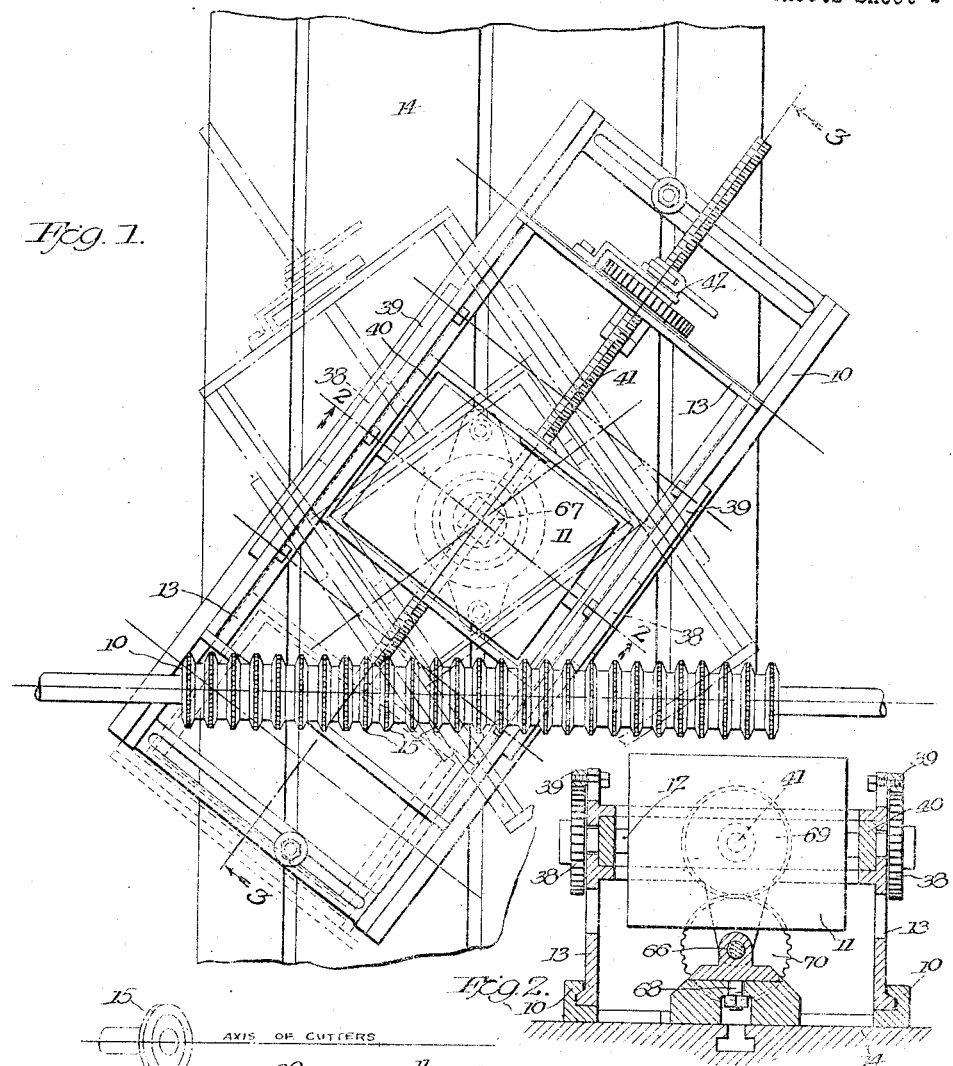

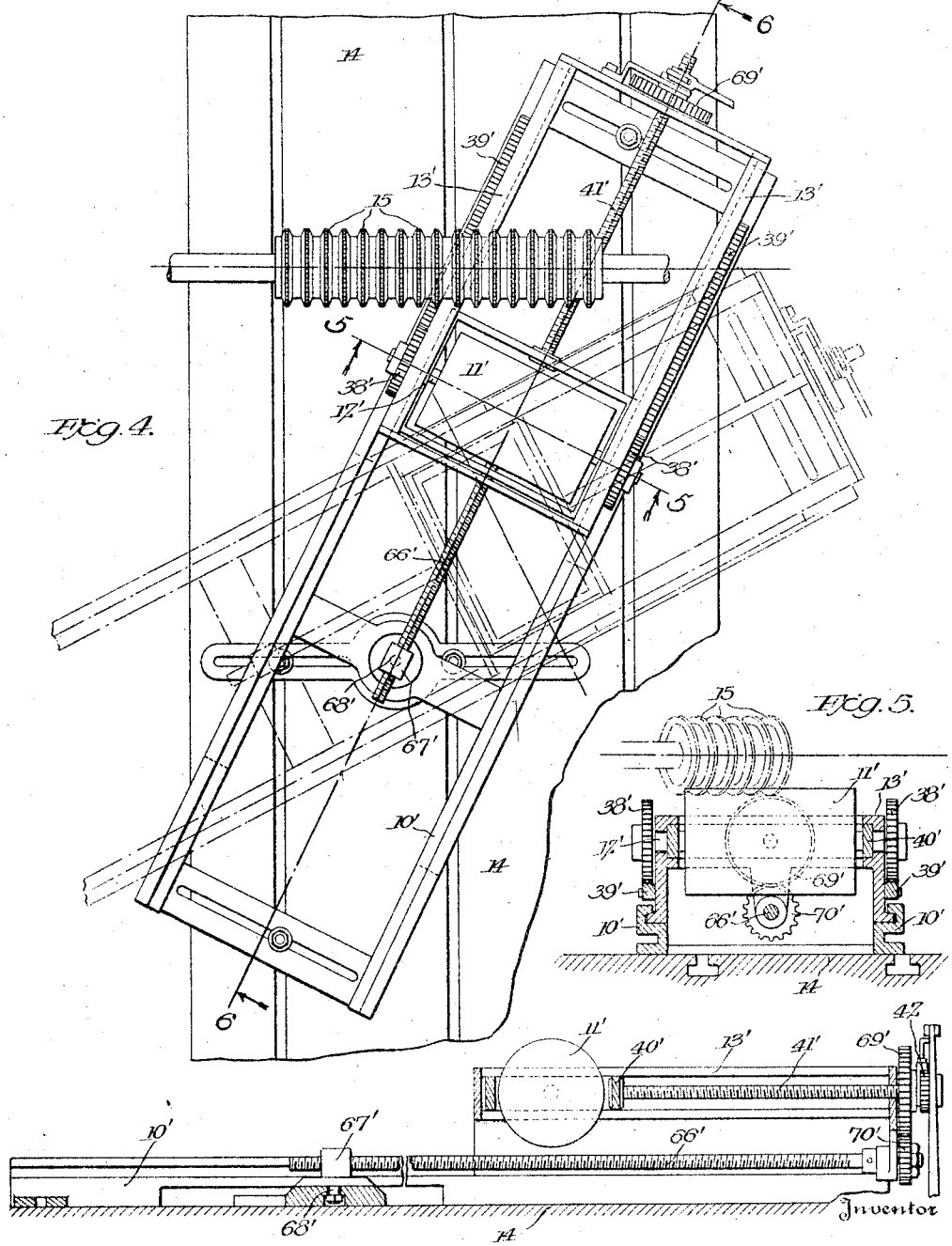

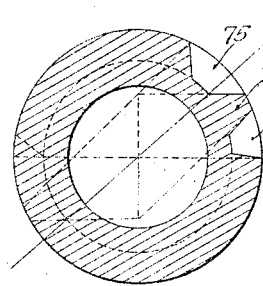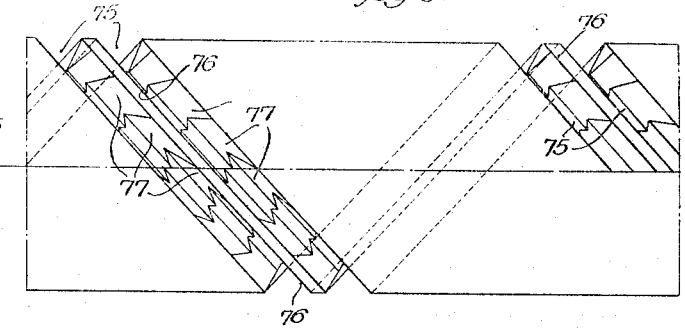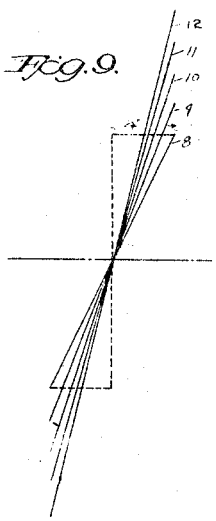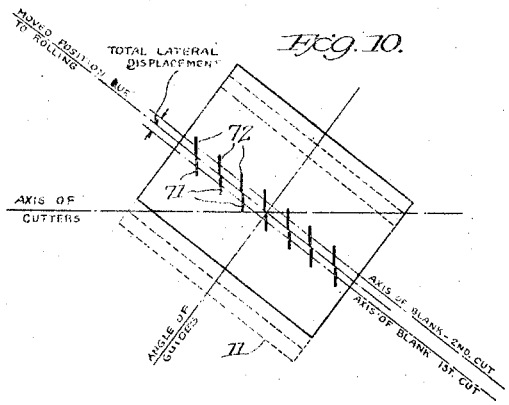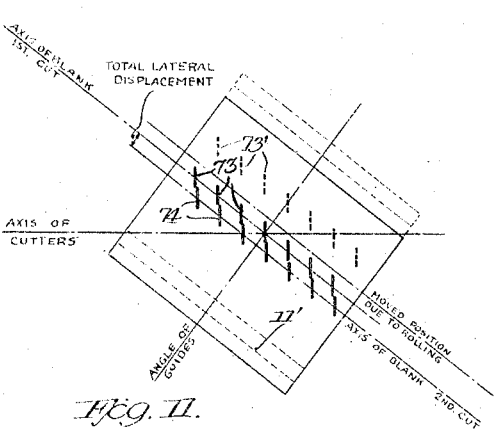

1,629,123

UNITED STATES PATENT OFFICE.

HENRY J. SCHMICK, OF WILLIAMSPORT, PENNSYLVANIA.

SCREW AND GEAR MAKING APPARATUS.

Application filed September 12, 1923. Serial No. 662,337.

This invention relates to the production of angle gears, screws, grooved cams and similar devices for transmitting power and converting motion involving movements partly sliding and partly rolling in their nature. Examples of such articles are described in my Patent Numbers 1,482,621, 1,482,622 and 1,482,623, granted February 5, 1924 of which this application is in part a continuation, and are characterized by working faces comprising spaced plane segments of uniform angular disposition and eccentricity with reference to the axis of rotation.

This invention aims to produce articles having the desired characteristics by simple, self compensating means easily adjustable and adaptable to various sizes and shapes as may be desired.

Suitable apparatus for accomplishing the desired aims, such as that illustrated in the accompanying drawings, forms part of the invention, although the invention is not restricted thereto. In the drawings, Fig. 1 is a plan view of a jig or combined work holder and indexing mechanism for a milling machine type of apparatus;

Figs. 2 and 3 are vertical sections of the same, on the lines 2—2 and 3—3 in Fig. 1, respectively;

Figs. 4, 5 and 6 are views similar to Figs. 1, 2 and 3, illustrating another form of jig suitable for performing the invention;

Figs. 7, 8, 9, 10 and 11 are diagrams illustrating various advantages of the invention.

The work carrying and indexing device shown in Figs. 1, 2 and 3 may be mounted on any movable or sliding support, such as the sliding table 14 of the machine illustrated in my Patent No. 1,482,621, whereby the work blank 11 may be repeatedly presented to the operation of the cutter or cutters 15, which are mounted for rotation above the work in any suitable manner.

This work supporting device comprises a guide frame 10 adapted to be pivotally mounted or secured upon the table or support 14 by clamps or T-bolts, so as to hold the work blank at any desired angle of traverse with reference to the direction of cutting movement. The guide frame is provided with slideways or rails for mounting a main sliding frame 13 and which in turn is provided with slideways for the slide 40 which carries the work blank arbor 12.

The work and arbor are held in proper angular position circumferentially by means of pinions 38 on the ends of the arbor which engage with racks 39 secured to the frame 13. The pinions 38 may be changed to suit the work, the racks being adjustable vertically by any suitable means in order to mesh properly. Slots are left in the sides of the frame 13 through which the ends of the arbor project in order to permit the arbor to move with the slide. The slide 40 is moved by a screw 41 fixed to the slide and engaging a nut 42 rotatably mounted on the frame 13. The pinions 38 roll on the racks 39 as the slide moves and thereby turn the arbor proportionally to the amount of movement of the slide.

The nut 42 may be adjusted by hand to feed or position the slide 40 and work blank between cuts, or it may be rotated by any suitable automatic means, such as that described in my patents referred to above.

The sliding frame 13 is moved in synchronism with the slide 40 by means of a screw 66 rotatably secured to it at one end and engaging a nut 67 secured to the reciprocatory supporting table 14 at the pivotal axis 68 of the guide frame 10. The screw 66 is rotated by suitable changeable gears 69, 70, from the nut 42, the gears shown being of the same pitch diameter whereby the screws are rotated in opposite directions at the same speed.

The apparatus illustrated in Figs. 4, 5 and 6 is similar to that illustrated in Figs. 1, 2 and 3, differing in having racks 39' arranged below the gears 38' on the work arbor 12', and in having right and left screws and changeable gears 69', 70', with pitch diameters bearing the ratio two to one for operating the screw 66'. Provision is made whereby the racks may be arranged either above or below the gears 38 in either apparatus and adjusted to suit the size gears it is desired to use.

The manner of operating the apparatus for performing the process is as follows: First the guide frame 10 is set at the desired angle of cut (see Figs. 1 and 4) and the work blank 11 is mounted on the arbor 12 and the slide 40 set at one end of the main sliding frame 13 which in turn is set at the corresponding end of the guide frame 10 in the arrangement illustrated in Fig. 1, and at opposite ends of each in the arrangement illustrated in Fig. 4. Then the table 14 is moved or fed either automatically or by hand forward and back to cause the cutters to make a series of cuts 71, the blank 11 occupying the position shown in dotted lines, as illustrated in Fig. 10; following which the nut 42 is turned to advance or push back the slide 40 slightly, thereby rolling the gears 38 on the racks 39 and rotating the arbor 12 so as to move the work blank ahead as shown in full lines ready for the next series of cuts 72.

In the form of apparatus illustrated in Figs. 1, 2 and 3, the racks 39 and gears 38 considered by themselves would operate to reverse the forward movement of the top of the work blank due to rolling forward as a whole, leaving the cuts obliquely behind their position when cut; but the rotation of the screw 66 serves to move the slidable support carrying the racks and gears forwards a like amount, thereby displacing the work as a whole forward and laterally, and causing the succeeding line of cuts to be spaced circumferentially substantially in angular alinement with the first line, as shown in Fig. 10.

In the form of apparatus illustrated in Figs. 4, 5 and 6, the rolling on the racks causes forward movement of the top of the work blank approximately double the advancing movement of the slide, thereby moving the series of cuts 73 to the positions shown in dotted lines 73' in Fig. 11; and turning the nut 42 causes the gears 69', 70', to rotate the screw 66' through twice the angle turned by the nut, whereby the main sliding frame 13' is moved backward twice the distance moved by the slide, and the cuts 73 are returned to approximately their original position lengthwise of the direction of cut, but because of the rotation of the blank and the angularity of the guide frame 10 they are displaced slightly axially and circumferentially so as to line up angularly with the next succeeding cuts 74 made by the same cutters, as illustrated in Fig. 11. Repetition of the cutting and indexing produces a series of parallel grooves 75 formed by the merging of the successive cuts, and when continuous around the blank these grooves constitute gear teeth 76, as illustrated in Figs. 7 and 8.

Successive cuts form angularly disposed segmental surfaces 77 (see Fig. 8) which intersect along straight lines advancing on one side and retreating on the other side with reference to the direction of the groove as they approach the circumference and having a constant change in direction reversing their angularity on opposite sides of the principal axis.

The working length of the racks, and hence the rolling length and lateral displacement of the work blank due to rolling action, depends upon the pitch diameter of the gears 38; and the lateral displacement due to sliding depends upon the ratio of the gears 69, 70, as well as upon the angle of the guide frame. By increasing or decreasing the size of these gears 38 from that of the blank, or by changing the ratio of the gears 69, 70, the lead may be shortened or lengthened, thereby condensing or expanding the relative spacing of the cuts laterally and diminishing or increasing the slope of the side walls with reference to a plane perpendicular to the axis, without changing the angle of cut. Hence it is possible to produce a gear or the like having a groove or tooth advancing in one turn through an axial distance of two or more times the lead of an ordinary helical tooth having the same angle of pitch line with respect to the axis of the cylinder as the angle of cut.

Also, by changing the angle of setting of the jig for the same size work and same working length of rack the lead and angle of cut can be varied between wide limits, and by reversing the angle of setting of the jig, as shown in dot and dash lines in Fig. 1, mating toothed gears of opposite direction of lead can be generated having any desired angle of working face within the capacity of the dimensions of the machine. By setting the jig at first one and then the other of two complementary angles mating toothed angle gearing of any desired ratio of teeth and pitch diameter may be generated. This is illustrated in Fig. 4, wherein the work is shown in full lines set at a cutting angle of approximately 25° and in dot and dash lines at 65° from the normal tangent to the work cylinder.

Also, if the length of the working portion of the racks 39 and diameter of the gears 38 rolling thereon be changed to suit the change in the angle of the guide frame 10 so as to maintain the total lateral displacement due to rolling and sliding uniform, the slope of the sides of the teeth may be increased or diminished with attendant effect upon the efficiency of the gearing thereby produced. For example, in Fig. 9 the operative length of rack is shown as 8", 9", 10", 11" and 12" and the lateral displacement 4" in each case, the resulting angle of cut being illustrated by the lines marked 8, 9, 10, 11 and 12 respectively. The best results are obtained with an obliquity such that the working length of the rack for the lead desired is about one-half the circumference of the work blank in the arrangement illustrated in Figs. 1, 2 and 3, and about equal to the circumference in the arrangement illustrated in Figs. 4, 5 and 6.

It is obvious from the foregoing description that the angular setting of the main supporting frame 10, the relationship between the diameter of the work and the pitch diameter of the gears 38 that control its angular position and the ratio of gearing between the screw 41 for moving the main sliding frame 13 and the screw 66 for moving the work carrying slide 40, each and all may be varied so as to produce articles having any desired angle of cut and circumferential and lateral spacing of successive cuts.

The principles underlying my invention may be understood by reference to my Patent No. 675,020, for "radiohelical cam", the present invention comprising a multiplicity of such cams angularly disposed and displaced both axially and circumferentially in quadrants of reversed angularity in balanced relation around the screw gear or cam, and constituting an oblique, multiple face combined axial and radial rotary motion device which may for convenience be termed a progressive radiohelical cam gear.

Figs. 7, 8, 9, 10, 11, 12 and 13 are for the purpose of illustrating diagrammatically the application of these principles to the present invention, the diagrams being imaginative merely and not representing exact dimensions or shapes of a marketable product.

Having described a preferred mode of carrying out the invention, without restricting the invention thereto, what I claim and desire to secure by Letters Patent is as follows:

1. In the manufacture of articles of the character described, a cutter having a fixed direction of cut, means for rotatably and slidably mounting a work blank for engagement by said cutter at the cutting point, said means being pivotally supported whereby the direction of sliding motion may be adjusted to suit the work in hand, and means for causing said work blank to roll in the line of direction of its sliding movement, said rolling means acting in opposition to said sliding means to return the work to the cutting point.

2. In the manufacture of articles of the character described, a cutter having a fixed direction of cut means for rotatably and slidably mounting a work blank for engagement by said cutter at the cutting point, said means being pivotally supported whereby the direction of sliding motion may be adjusted to suit the work in hand, and means for causing said work blank to roll in the line of direction of its sliding movement, said rolling means acting in opposition to said sliding means to return the work to the cutting point, and means for maintaining said opposed movements in a predetermined ratio suitable for the work in hand.

3. A work support comprising a guide frame adapted to be adjusted angularly around a vertical axis, a main supporting frame movably mounted on said guide frame, a slide carried by said supporting frame and slidable in the same direction as the guide frame, means for moving said frames simultaneously causing movement of said slide upon said supporting frame in proportion to the movement of the latter upon said guide frame, and a work holder rotatably mounted upon said slide and arranged to turn in proportion to the movement of said slide upon said supporting frame.

4. A jig comprising a guide frame, a main supporting frame mounted thereon carrying a slidable work support, rotatable means on the work support for carrying the work, said rotatable means having a pinion engaging a rack on the main supporting frame whereby when the work is rotated it is moved laterally with a combined rotating and rolling motion, and gearing carried by said main supporting frame and slide for positioning the slide on the supporting frame and supporting frame on the guide frame.

5. A jig comprising a guide frame, a main supporting frame mounted thereon carrying a slidable work support, rotatable means on the work support for carrying the work, said rotatable means having a pinion engaging a rack on the main supporting frame whereby when the work is rotated it is moved laterally with a combined rotating and rolling motion, and gearing carried by said main supporting frame and slide for positioning the slide on the supporting frame and supporting frame on the guide frame, said gearing comprising lead screws carried by said slide and main supporting frame respectively and respectively engaging said main supporting frame and guide frame for positioning said movable members relatively to each other and the fixed support, and changeable gears operatively connecting said lead screws.

6. A jig comprising a guide frame, a main supporting frame mounted thereon carrying a slidable work support, rotatable means on the work support for carrying the work, said rotatable means having a pinion engaging a rack on the main supporting frame whereby when the work is rotated it is moved laterally with a combined rotating and rolling motion, said pinion being changeable for one of different pitch diameter and said rack being adjustable thereto, and gearing carried by said main supporting frame and slide for positioning the slide on the supporting frame and supporting frame on the guide frame.

7. Apparatus of the character described comprising a cutting point, a guide frame pivotally adjustable thereto, a main supporting frame movably mounted thereon carrying a slidable work support, said main supporting frame and work support being connected to move in unison upon said guide frame, and rotatable means on said work support for positioning the work circumferentially, said rotatable means and main supporting frame being operatively connected to control the circumferential position of said work by the relative position of said work support on said main supporting frame.

8. Apparatus for the production of progressive radio-helical cam gears having grooved working portions characterized by straight part segments arranged eccentrically at angles less than the normal slope of the surfaces formed thereby, comprising means for providing a series of spaced transverse cuts oblique and eccentric to the axis of rotation, in combination with means for displacing successive cuts circumferentially and laterally as by rolling the article to move said cuts in one direction along a path transverse to its axis and sliding it in the reverse direction a distance bearing a predetermined ratio to the extent of rolling.

9. Apparatus for the production of articles as described in claim 8 wherein the extent of sliding relative to rolling movement bears a ratio not greater than two to one.

10. Apparatus for the production of articles as described in claim 8 wherein the extent of sliding relative to rolling movement is approximately the same.

11. Apparatus for the production of articles as described in claim 8 wherein the obliquity of the angle of cut is approximately the same as that of the direction of rolling.

12. Apparatus for the production of articles as described in claim 8 wherein the obliquity of the angle of cut is such as produces the desired lead with a rolling movement approximately the same as the circumference of the blank.

In testimony whereof, I have signed my name to this specification.

HENRY J. SCHMICK.